United States Patent [19]
Etoh

[11] Patent Number: 5,479,218
[45] Date of Patent: Dec. 26, 1995

[54] MOTION VECTOR DETECTING APPARATUS

[75] Inventor: Minoru Etoh, Katano, Japan

[73] Assignee: Matsushita Electric Industrial Co., Ltd., Japan

[21] Appl. No.: 141,051

[22] Filed: Oct. 26, 1993

[30] Foreign Application Priority Data

Nov. 2, 1992 [JP] Japan .................................... 4-294120

[51] Int. Cl.$^6$ .................................................. H04N 7/32
[52] U.S. Cl. ............................................................ 348/699
[58] Field of Search ................................... 348/699, 407, 348/413, 416; H04N 7/137

[56] References Cited

U.S. PATENT DOCUMENTS

| | | | |
|---|---|---|---|
| 5,166,788 | 11/1992 | Lee | 348/699 |
| 5,212,548 | 5/1993 | de Haan | 348/699 |
| 5,257,102 | 10/1993 | Wilkinson | 348/699 |
| 5,327,232 | 7/1994 | Kim | 348/699 |

FOREIGN PATENT DOCUMENTS 0383245  8/1990  European Pat. Off. .

OTHER PUBLICATIONS

Proceedings 1991 IEEE Computer Society Conference on Computer Vision and Pattern Recognition; Lahaina, Maui, Hawaii, Jun. 3–6, 1991, IEEE Computer Society Press Los Alamitos, Calif., US, XP337374 Mark Allmen et al. "Long–Range Spatiotemporal Motion Understanding Using Spatiotemporal Flow Curves"; p. 305, right column, paragraph 3 —p. 307, paragraph 4.

Systems & Computers In Japan, vol. 18, No. 5, May 1987, New York US pp. 36–46; Masanobu Yamamoto, "Three–dimensional Motion Analysis of Scene Containing Multiple Moving Objects from Image Sequence and Depth"l; p. 40, left column, paragraph 5 —p. 41, right column, paragraph 5.2.

*Primary Examiner*—Howard W. Britton
*Attorney, Agent, or Firm*—Beveridge, DeGrandi, Weilacher & Young

[57] ABSTRACT

By expanding the technique of detection of a motion vector by the of time-space differential method, (1) repetitive calculations are not needed, (2) different motion vectors near the boundary of an object can be detected, and (3) coupling of the region segmentation and the framework is enabled. For this, a horizontal direction differentiating filter (104), a vertical direction differentiating filter (105), and a time direction differentiating filter (106) calculate the time-space differential ($\partial I/\partial x$, $\partial I/\partial y$, $\partial I/\partial t$) in formula (2) necessary for motion vector estimation in every pixel. A feature vector combining part (110) generates a sample vector coupling the time-space differential value and position for a random image position (x, y), and clusters from pairs of samples and classes, to minimize the difference in a maximum likelihood class determining part (112) and a maximum likelihood class data changing part (113). The motion vector is obtained from the third eigen vector of covariance matrix of the time-space differential value.

4 Claims, 4 Drawing Sheets

MOTION VECTOR DETECTING APPARATUS

BACKGROUND OF THE INVENTION

1. Field of the Invention

The present invention relates to a motion vector detecting apparatus for coding images, reducing noise, tracing objects, etc.

2. Related Art of the Invention

A technique of motion vector detection on the basis of a time-space differentiating method has been already proposed, for example, as Horn's method (Horn, B. K. P. and B. G. Shunk: "Determining optical flow," Artificial Intelligence, Vol. 17, pp. 185–203, 1981). In this method, the brightness of point (x, y) on the image at time t is supposed to be I (x, y, t), and an object is assumed to move by $\Delta x$ on the x-axis and by $\Delta y$ on the y-axis during infinitesimal time $\Delta t$. Assuming the brightness of the same point on the object to be constant, formula (1) is established.

$$I(x,y,t)=I(x+\Delta x, y+\Delta y, t+\Delta t) \tag{1}$$

By Taylor series expansion of the right side of formula (1), higher order terms are ignored, and considering the extremity of $\Delta t=0$ by dividing by $\Delta t$, formula (2) is established.

$$u\frac{\partial I}{\partial x} + v\frac{\partial I}{\partial y} + \frac{\partial I}{\partial t} = 0 \tag{2}$$

where $u=d\Delta x/dt$, $v=d\Delta y/dt$. Supposing (u, v) to be a velocity vector, it becomes a constraint equation by time-space differentiation. In this constraint equation, a straight line on which the motion vector (u, v) can be determined from the time-space differentiation of luminance, but a certain constraint is needed to determine (u, v). Horn, supposing that (u, v) changes smoothly on the image, applied a new constraint, and determined the motion vector. As a prior art of this detecting apparatus for a motion vector, its structural drawing is shown in FIG. 1. In FIG. 1, numeral 301 is an A/D converter, 302,303 are frame memories, 304 is a horizontal direction differentiating filter, 305 is a vertical direction differentiating filter, 306 is a time direction differentiating filter, 307 is a horizontal direction differential image memory, 308 is a vertical direction differential image memory, 309 is a time direction differential image memory, 310 is a horizontal direction motion memory, 311 is a horizontal direction motion estimating part, 312 is a vertical direction motion estimating part, 313 is a vertical direction motion memory, and 314,315 are smoothing filters.

The image entered through the A/D is delayed by 1 frame time in the frame memory 302, and sequentially passes through the frame memory 303.

The horizontal direction differentiating filter 304, vertical direction differentiating filter 305, and time direction differentiating filter 306 calculate the time-space differentiation ($\partial I/\partial x$, $\partial I/\partial y$, $\partial I/\partial t$) of formula (2) necessary for estimation of the motion vector in each pixel.

The calculation results are respectively recorded in the horizontal direction differential image memory 307, vertical direction differential image memory 308, and time direction differential image memory 309.

Since the image is sampled, the calculation of differentiation is replaced by calculation of a difference method.

Horn, supposing that (u,.v) changes smoothly on the image, determined the motion vector in a form of minizing formula (3).

$$E=\iint \alpha^2((u,v)-(\bar{u},\bar{v}))^2+(uI_x+vI_y+I_t)^2 dxdy \tag{3}$$

Hereinafter, for the sake of simplicity, ($\partial I/\partial x$, $\partial I/\partial y$, $\partial I/\partial t$) is expressed as (Ix, Iy, It). Minimization of formula (3) can be solved by the repetition shown iin formula (4) in a form of solving the Euler-Lagrange equation obtained by partial differentiation of the formula (3). Herein, ($\bar{u}$, $\bar{v}$) is the vicinity average of motion vector, k is the number of repetitions, and $\alpha$ is a constant.

$$u^{k+1}+\bar{u}^k-Ix(I_x\bar{u}^k+I_y\bar{v}^k+I_t)/(\alpha^2+I_x^2+I_y^2)$$

$$v^{k+1}+\bar{v}^k-Iy(I_x\bar{u}^k+I_y\bar{v}^k+I_t)/(\alpha^2+I_x^2+I_y^2) \tag{4}$$

($U_{k+1}$, $V_{k+1}$) in formula (4) is calculated respectively in the horizontal direction motion estimating part 311 and the vertical direction motion estimating part 312, and restored in the horizontal direction motion memory 310 and the vertical direction motion memory 313.

The vicinity average necessary for calculation is calculated by the smoothing filters 314, 315. Thus, according to this conventional detecting apparatus for a motion vector, the motion vector can be determined by motion estimation and vicinity smoothing.

In the foregoing prior art, however, the following problems are present:

(1) Repeated calculations of more than scores of times are generally needed, and the processing time is long;

(2) Smoothing is necessary for determining the vicinity average, and hence different motion vectors near the boundary of the object are smoothed and are not determined accurately; and (3) The estimation error is large on the boundary of the object.

The second and third problems are due to the mutual dependence of the estimation of the motion vector and region segmentation of the image. For estimation of the motion vector, certain coupling with a framework of region segmentation is required.

SUMMARY

It is hence a primary object of the invention to solve the above problems enhance ithe precision of the detection of a motion vector on the object boundary of the detecting apparatus of the motion vector, and shorten the processing time.

A motion vector detecting apparatus of the present invention comprises:

(a) a memory for holding video signals which are coded and composed of frame units, (b) a horizontal differentiating filter for reading out luminance data from the memory and differentiating (executing a differential method) or differencing (executing a difference method) in a horizontal direction of arbitrary image coordinates, (c) a vertical differentiating filter for reading out luminance data from the memory and differentiating or differencing in the vertical direction of the image coordinates, (d) a time differentiating-filter for reading out the luminance data of preceding and succeeding frames from the memory, and differentiating or differencing in a time direction, (e) feature vector combining the means for combining luminance differential vector (Ix, Iy, It) including the results of the horizontal differentiating filter, the vertical differentiating filter and the time differentiating filter, and the position vector (x, y) of the image coordinates, to obtain a sample vector, (f) a memory for holding a plurality of an estimation of a motion vector (u, v) and a position vector mean $(\bar{x}, \bar{y})$ of the sample vector as class data, (g) nearest class determining means for determining a distance between the class data and the sample vector from a formula $(x-\bar{x}, y-\bar{y})$ and a formula $(u*Ix+v*Iy+It)$, and achieving a correspondence between the sample vector and nearest class data, and (h) class data changing means for changing the class data in a manner that a distance sum between the class data and one or more sample vectors becomes smaller, from one or more sample vectors and the class data of which correspondence has been achieved by the nearest class determining means.

According to this constitution, the time-space differential (Ix, Iy, It) is obtained from the memory holding the video signals composed in frame units, by means of the horizontal differentiating filter, the vertical differentiating filter, and the time differentiating filter. Furthermore, in the sample vector combining means, the above (Ix, Iy, It) and the position vector (x, y) of the image coordinates are coupled to obtain a sample vector. Then, the position vector mean $(\bar{x}, \bar{y})$ and an estimation of the motion vector (u, v) of the sample vector, is held in a plurality as class data by the memory. The nearest class determining means selects the one closest to the sample data from the plural class data in the memory, on the basis of the operation of $(x-\bar{x}, y-\bar{y})$ and $(u*Ix+v*Iy+It)$, and their correspondence is determined. As a result, the correspondence is made with the class data having the motion vector satisfying the constraint equation by the time-space differentiation near the space position on the image. From this correspondence, the class data changing means changes the class data so that the distance sum with one or more sample vectors may be smaller, from the corresponding class data and one or more sample vector data.

Accordingly, the class data is changed so that the distance to the sample vector may be statistically smaller, and, as a result, the class data comes to represent the motion vector (u, v) of a certain position $(\bar{x}, \bar{y})$ in the image. In this way, by collecting plural sample vectors from the vicinity in the image, it is expected that plural constraint equations of space differential may be obtained, and the motion vector is determined. If there is a different motion near the object boundary, the distance from one sample vector to the other class data becomes longer, so that the demerit of the conventional smoothing may be avoided.

PREFERRED EMBODIMENTS

Figure 1:
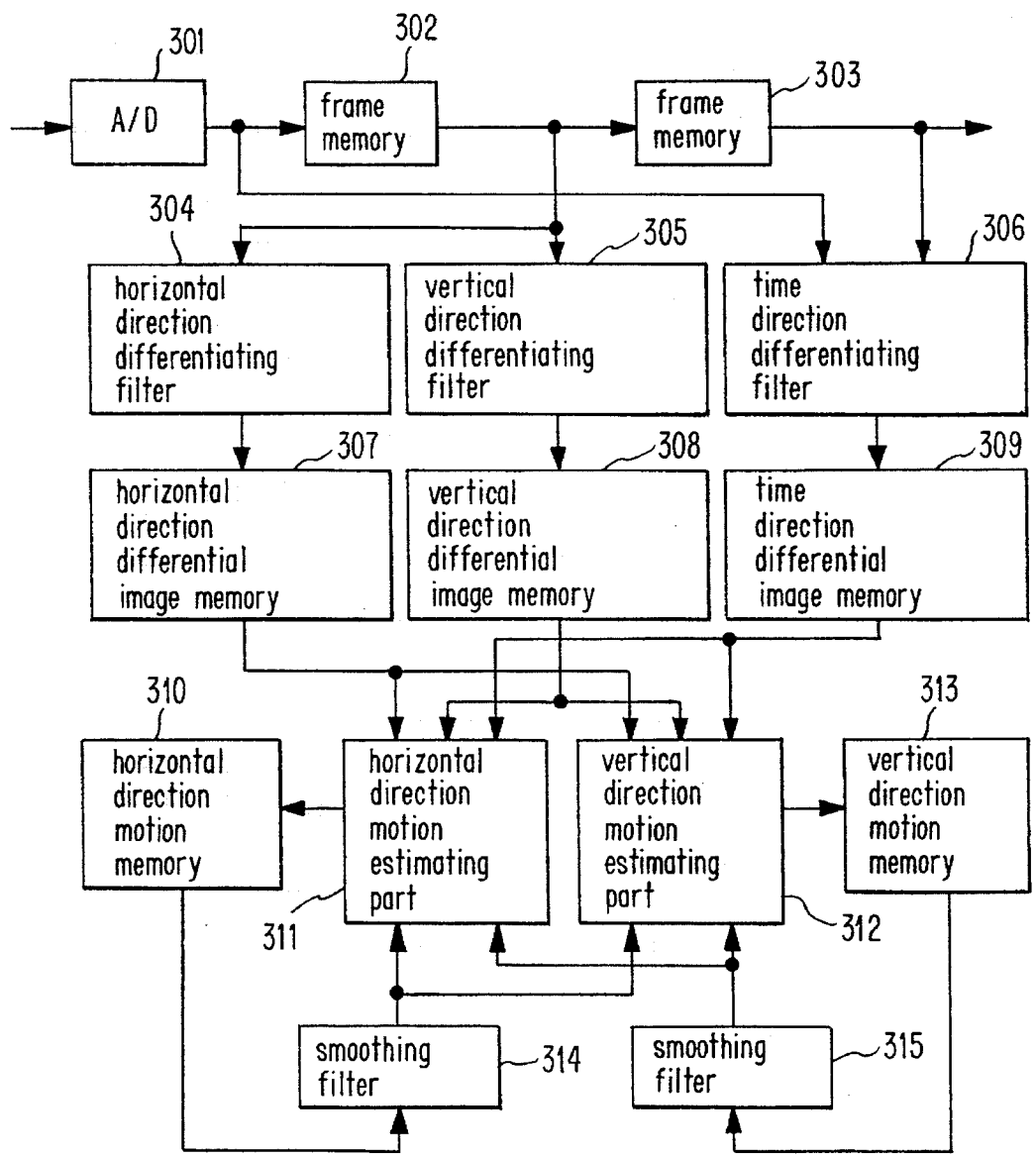
FIG. 1 is a structural diagram of a detecting apparatus for a motion vector in the prior art.

Referring to the drawings, some of the embodiments of the invention are described in detail below: The first embodiment of the invention is described by reference to FIGS. 2, 4a and 4b.

Figure 2:
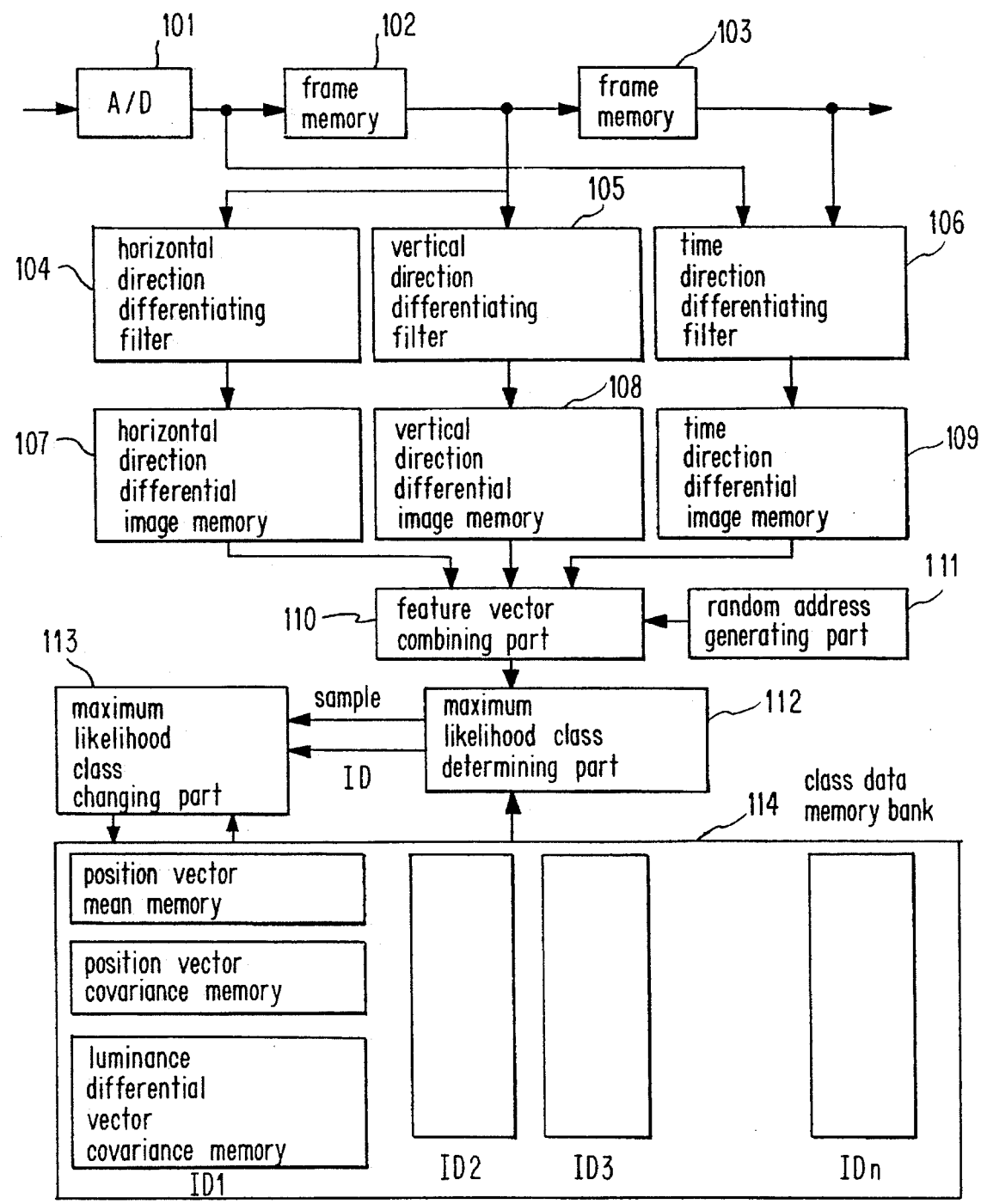
FIG. 2 is a structural diagram of a first embodiment of the detecting apparatus of a motion vector.
Figure 4A:
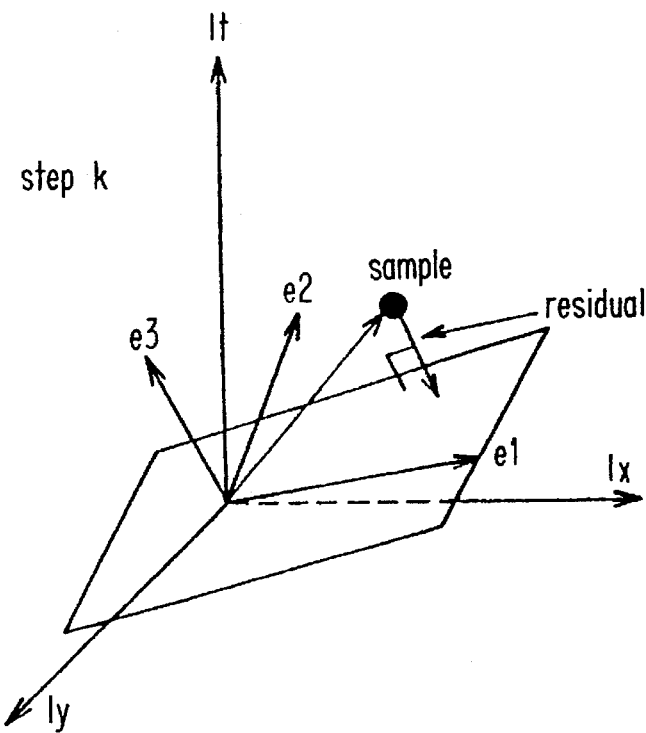
FIG. 4a and 4b are principle diagrams describing the estimation of a motion vector in the first and second embodiments of the detecting apparatus of a motion vector.
Figure 4B:
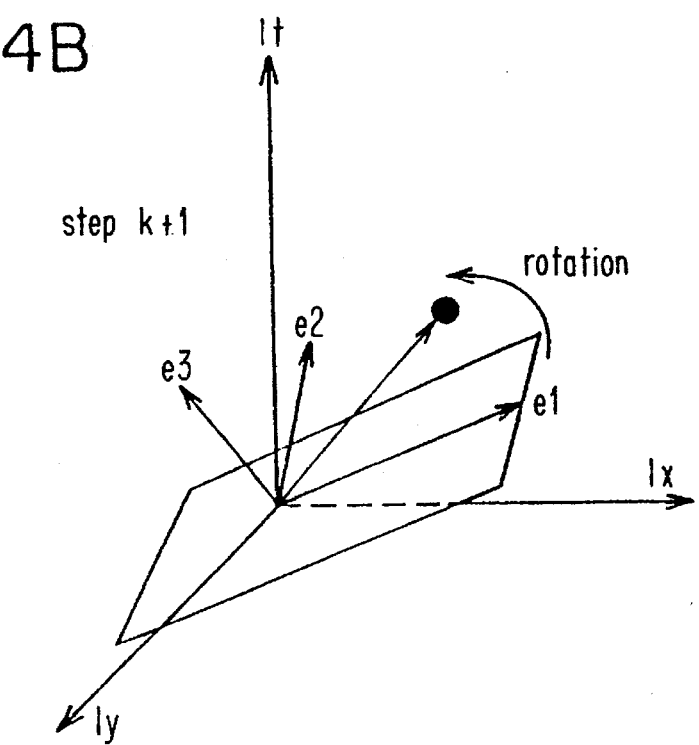

FIG. 2 is a structural diagram of a detecting apparatus of a motion vector in the first embodiment of the invention. FIGS. 4a and 4b are diagrams showing the principle of estimation of motion in the first embodiment. In FIG. 2, numeral 101 is an A/D converter, 102, 103 are frame memories, 104 is a horizontal direction differentiating filter, 105 is a vertical direction differentiating filter, 106 is a time direction differentiating filter, 107 is a horizontal direction differential image memory, 108 is a vertical direction differential image memory, 109 is a time direction differential image memory, 110 is a feature vector combining part, 111 is a random address generating part, 112 is a maximum likelihood class determining part as an example of a nearest class determining means, 113 is a maximum likelihood class changing part, and 114 is a class data memory bank.

The image entered through the A/D 101 is delayed by 1 frame time in the frame memory 102, and sequentially passes through the frame memory 103.

The horizontal direction differentiating filter 104, vertical direction differentiating filter 105, and time direction differentiating filter 106 calculate the time-space differentiation $(\partial I/\partial x, \partial I/\partial y, \partial I/\partial t)$ of formula (2) necessary for estimation of the motion vector in each pixel. The calculation results are respectively recorded in the horizontal direction differential image memory 107, vertical direction differential image memory 108, and time direction differential image memory 109. Since the image is sampled, the calculation of differentiation is replaced by the calculation of a difference.

The random address generating part 111 generates the horizontal and vertical positions on the screen randomly by using random numbers. The feature vector combining part 110, receiving the image position (x, y), reads out the time-space differential value, (Ix, Iy, It), at that position from the memories 107, 108, 109, and generates the sample vector $(Ix, Iy, It, x, y)^t$ $[()^t$ means transposition of the matrix]. On the other hand, in the class data memory bank 114, n pieces of class data are stored. In this embodiment, the class data comprises the mean (s) of position vector $p=(x\ y)^t$, the covariance matrix S of the position vector and the covariance matrix M of the luminance differential vector $d=(Ix, Iy, It)^t$, in the sample vector $(Ix, Iy, It, x\ y)^t$.

The eigen vectors af matrix M normalized at norm 1 are supposed to be e1, e2, e3 from the largest one of the corresponding eigen values. The initial value of the class data is set so as to be equal in intervals on the screen with respect to the position, and the covariance matrices S and M are supposed to be unit matrices. At this time, the eigen vector e3 of M is particularly defined as (0, 0, 1). In the maximum likelihood class determining part 112, using the distance shown in formula (5), the sample vector combined at random positions is made to correspond to the class data at the shortest distance from it.

$$\iota(p,d|s_i,S_i,M_i)=(-s_i)^tS_i^{-1}(p-s_i)+ln|S_i|+\sigma_i^{-2}(d^te3_i)^2+ln\ \sigma_i^2, \quad (5)$$

where $$\sigma_i=|e3_i|/e33_i$$

This correspondence is not limited to use in the form of formula (5), wherein (e33) is an It component of even vector e3. In this embodiment, when one set of correspondence of the sample vector and the class data is obtained, the corresponding class data is sequentially changed in the maximum likelihood class data changing part 113. As for the k-th sample vector, the identifier of its class data is supposed to be i. The class data of data other than i is not changed, and only data i is changed in the class data i in formulas (6), (7), (8).

$$s_i^{(k+1)} = s_i^{(k)} + \alpha(p - s_i^{(k)}), \quad 0.0 \leq \alpha < 1.0 \tag{6}$$

$$S_i^{(k+1)} = (1-\beta)S_i^{(k)} + \beta(p - s_i^{(k)})(p - s_i^{(k)})^t, \quad 0.0 \leq \beta 1.0 \tag{7}$$

$$M_i^{(k+1)} = (1-\gamma)M_i^{(k)} + \gamma dd^t, \quad 0.0 \leq \gamma < 1.0 \tag{8}$$

By applying the foregoing random address generation, feature vector combination, maximum likelihood class determination, and data change of maximum likelihood class into several samples, self-organization of the class data is executed. That is, a set of pixels in the vicinity in the image and commonly satisfying the constraint of motion forms a set of identical class data. The random address generation is intended to prevent deviation of time for changing the sequential class data. FIGS. 4a and 4b show the principle of motion estimation in this embodiment. Considering the feature space of the luminance differential vector $d = (Ix, Iy, It)^t$, if all data are satisfying the constraint equation of the time-space differentiation, they should distribute on one plane as shown in the top of FIG. 4a. Therefore, the expected value of $dd^t$, that is, the first eigenvector and second eigen vector of covariance matrix M, will span (determine) this plane. The third eigen vector is the unit normal vector of this plane, and supposing its component to be (e31, e32, e33), it may be obtained as $(u, v) = (e31/e33, e32/e33)$.

The change of the covariance matrix shown in formula (8) in the maximum likelihood class data changing part 113 corresponds to rotation of the plane shown in FIGS. 4a and 4b. Accordingly, the third eigen vector e3 is set away from the sample vector, and the distance calculated from (u*Ix+ v*Iy+It) is decreased as for such sample vector.

It is a feature of this embodiment that the motion vector estimation is determined as the eigen vector of the covariance matrix. Incidentally, when determining only e3, it is possible to approximate sequentially by rotating the subspace expressed by e3 as shown in formula (9). In formula (9), I denotes a unit matrix of 3×3.

$$e3_i^{(k+1)} = e3_i^{(k)}(I - \epsilon dd^t), 0.0 \leq \epsilon 1.0 \tag{9}$$

where $\epsilon$ is a constant.

By determining the eigen vector of the covariance matrix, the reliability of the determined motion vector can be evaluated. The rank of M is ideally 2, and supposing the eigen values to be $\lambda 1 > \lambda 2 > \lambda 3$, if the value of $\lambda 2/\lambda 3$ is large, the reliability of the obtained motion vector is high. In this embodiment, moreover, since the class data are sequentially changed, fewer memories are required.

Figure 3:
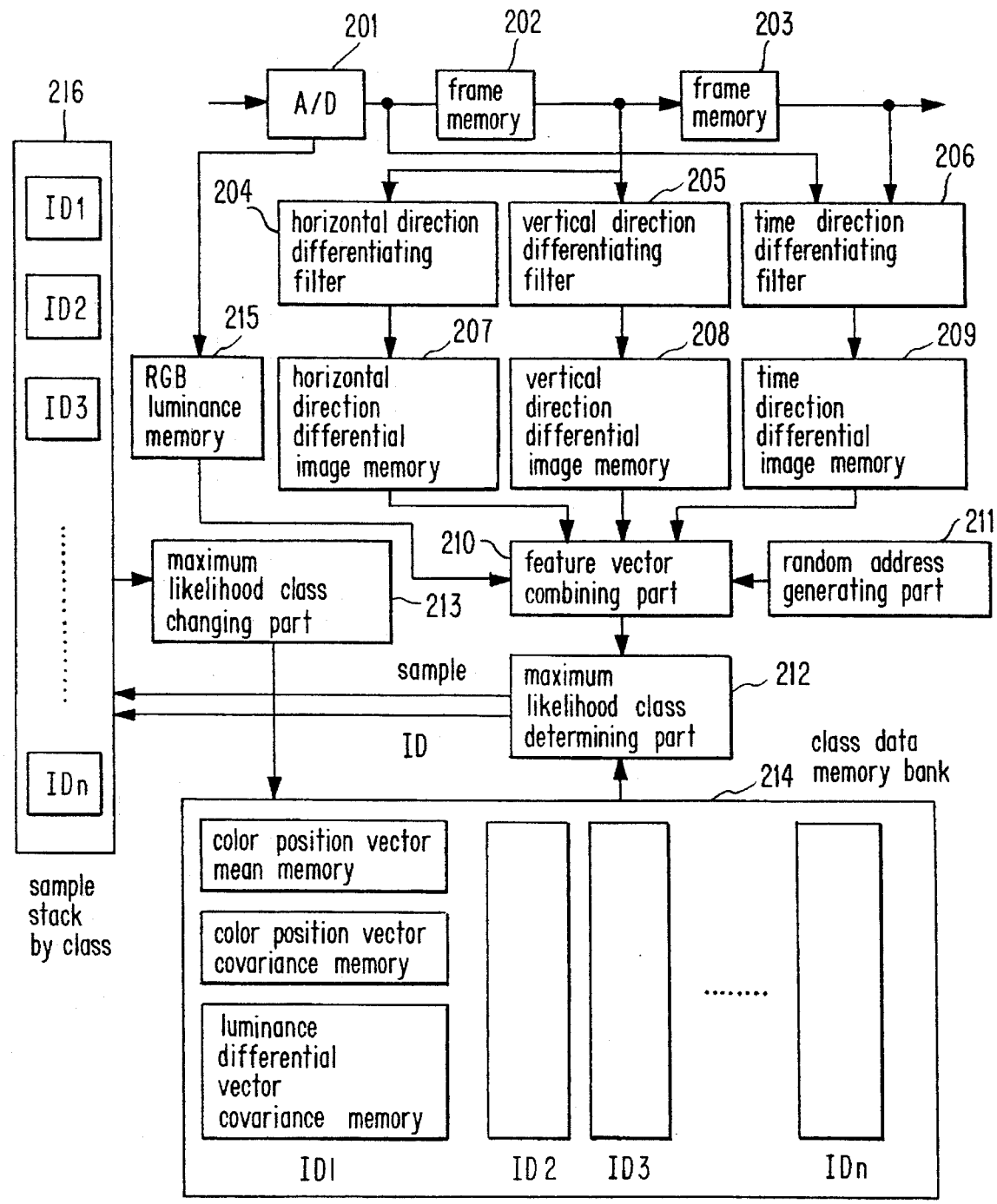
FIG. 3 is a structural diagram of a second embodiment of the detecting apparatus of a motion vector.

The second embodiment of the invention is described below by referring to FIG. 3. FIG. 3 is a structural diagram of a detecting apparatus of comotion vector in the second embodiment.

In FIG. 3, numeral 201 is an A/D converter, 202,203 are frame memories, 204 is a horizontal direction differentiating filter, 205 is a vertical direction differentiating filter, 206 is a time direction differentiating filter, 207 is a horizontal direction differential image memory, 208 is a vertical direction differential image memory, 209 is a time direction differential image memory, 210 is a feature vector combining part, 211 is a random address generating part, 212 is a maximum likelihood class determining part, 213 is a maximum likelihood class changing part, 214 is a class data memory bank, 215 is an RGB luminance memory, and 2 6 is a sample stack by class. In the second embodiment, the RGB color vector is newly combined with the sample vector. The change of maximum likelihood class data is not sequentially changed as in the first embodiment, but it is the repetition of the following two steps:

Step 1) A pair of sample vector and class data are stored at least by ten sets or more for each class; and Step 2) The class data is directly calculated from the plural sets.

Thus, expansion of the sample vector and changing step of the class data are different from the first embodiment. These differences are described below.

The A/D 201 encodes the luminance and RGB value, and the RGB value is stored in the RGB luminance memory 215. The operation of the means from 202 to 209 and 211 is same as the function of the corresponding constituent elements in the first embodiment. The feature vector combining part 210 receives the randomly generated image position (x, y), and reads out the time-space differential value, (Ix, Iy., It), RGB value (r, g, b), and generates the sample vector (Ix, Iy, It, x, y, r, g, b)$^t$. On the other hand, n pieces of class data are stored in the class data memory bank. In the second embodiment, the class data comprises the mean (t) of the color position vector $q = (x, y, r, g, b)^t$, covariance matrix $\Sigma$ of the color position vector, and covariance matrix M of the luminance differential vector $d = (Ix, Iy, It)^t$, in the sample vector (Ix,Iy, It, x, y, r, g, b)$^t$. As in the first embodiment, the eigen vectors of the matrix M normalized at norm 1 are supposed to be e1, e2, e3 from the largest one of the corresponding eigen values. The initial value of the class data is set so as to be equal in intervals on the screen with respect to the position, and the covariance matrices $\Sigma$ and M are supposed to be unit matrices. At this time, the eigen vector e3 of M is particularly defined as (0, 0, 1).

In the maximum likelihood class determining part, using the distance expressed in formula (10), correspondence is made between the sample vector combined at random positions and the class data at the minimum distance therefrom.

$$\iota(q,d|t_i, \Sigma_i, M_i) = (q-t_i)^t \Sigma_i^{-1}(q-t_i) + \ln|\Sigma_i| + \sigma_i^{-2}(d^t e3_i)^2 + \ln \sigma_i^2, \tag{10}$$

where $$\sigma_i = |e3_i|/e33_i$$

The covariance matrix $\Sigma$ is limited in a manner that the covariance C about the color and covariance S about the position are independent as shown in formula (11).

$$\Sigma_i = \begin{pmatrix} C_i & 0 \\ 0 & S_i \end{pmatrix} \tag{11}$$

In this embodiment, the correspondence of the sample vector and the class data is executed by a specified number of times in the maximum likelihood class determining part 212 (for example, the number of classes n×about 100 times), and the corresponding sample vectors are stored in the sample stack 216 by class by each class identifier. Thereafter, on the basis of the sample stored in the sampling stack 216 by class, operations of formulas (12), (13), (14) are performed by the maximum likelihood class changing part 213, and the mean $t^{(1)}$ of the color position vector and its covariance matrix $\Sigma^{(1)}$, and covariance matrix $M^{(1)}$ of the luminance differential vector are updated to $t^{(l+1)}$ and $\Sigma^{(l+1)}$, $M^{(l+1)}$.

In formulas (12), (13), (14), (mi) are the number of samples in the stack by class, and (1) denotes the number of times of updating.

$$t_i^{(l+1)} = \frac{1}{m_i} \sum_{q \in \text{class } i} q \quad (12)$$

$$\Sigma_i^{(l+1)} = \frac{1}{m_i} \sum_{q \in \text{class } i} (q - t_i^{(l+1)})(q - ti^{(l+1)})^t \quad (13)$$

$$M_i^{(l+1)} = \frac{1}{m_i} \sum_{d \in \text{class } i} (dd^t) \quad (14)$$

By repeating about l>10 times, the sample vectors are clustered. By combining the color : information, separation of different objects is improved, and the motion, vector detection precision in the region is enhanced. The region segmentation combining color and motion is performed. In this embodiment, random address generation is not essential, but deviation of the estimation can be prevented if the number of samples in the sampler stack by class exceed the storing limit.

According to the invention, as compared with the conventional detecting apparatus of a motion vector on the basis of the time-space differential method, the following effects are brought about:

(1) Repetitive operations are not necessary, and the processing time is shorter;

(2) The region can be segmented by a combination of color and other information;

(3) Large estimation error does not occur in the region boundary.

Hence, the invention can be applied in image coding, noise reduction, and object tracing, and its application effects are great.

What is claimed is:

1. A motion vector detecting apparatus comprising:

(a) a memory for holding video signals which are coded and composed of frame units, (b) a horizontal differentiating filter for reading out luminance data from the memory and differentiating in a horizontal direction of arbitrary image coordinates, (c) a vertical differentiating filter for reading out luminance data from the memory and differentiating in a vertical direction of the image coordinates, (d) a time differentiating filter for reading out the luminance data of preceding and succeeding frames from the memory, and differentiating in a time direction, (e) feature vector combining means for combining a luminance differential vector (Ix, Iy, It), including results from the horizontal differentiating filter, the vertical differentiating filter and the time differentiating filter, with a position vector (x, y) of the image coordinates, to obtain a sample vector, (f) a memory for holding a plurality of estimations of a motion vector (u, v) and a position vector mean ($\bar{x}$, $\bar{y}$) of the sample vector as class data, (g) nearest class determining means for determining a distance between the class data and the sample vector from a formula (x−$\bar{x}$, y,−$\bar{y}$) and a formula (u*Ix+v*Iy+It), and achieving a correspondence between the sample vector and the nearest class data, and (h) class data changing means for changing the class data in a manner that a distance sum between the class data and one or more sample vectors becomes smaller, from one or more sample vectors and the class data of which correspondence has been achieved by the nearest class determining means.

2. A motion vector detecting apparatus comprising:

(a) a memory for holding video signals which are coded and composed of frame units, (b) a horizontal differentiating filter for reading out luminance data from the memory and differentiating in a horizontal direction of arbitrary image coordinates, (c) a vertical differentiating filter for reading out luminance data from the memory and differentiating in a vertical direction of the image coordinates, (d) a time differentiating filter for reading out the luminance data of preceding and succeeding frames from the memory, and differentiating in a time direction, (e) sample vector combining means for reading out color data including an array of one or more luminance values differing in color from the memory, combining (a) the color data, (b) a luminance differential vector (Ix, Iy, It), including results from the horizontal differentiating filter, the vertical differentiating filter and the time differentiating filter, and (c) a position vector (x, y) of the image coordinates, to obtain a sample vector, (f) a memory for holding a plurality of a position vector mean ($\bar{x}$, $\bar{y}$), an estimation of a motion vector (u, v), and a mean of the color data of the sample vector, as class data, (g) nearest class determining means for determining a distance between the class data and the sample vector from a formula of (x−$\bar{x}$, y−$\bar{y}$), a formula of (u*Ix+v*Iy+It) and a difference between the color data and the color data mean, and achieving a correspondence between the sample vector and the nearest class data, and (h) class data changing means for changing the class data in a manner that a distance sum between the class data and one or more sample vectors becomes smaller, from one or more sample vectors and the class data of which correspondence has been achieved by the nearest class determining means.

3. A motion vector detecting apparatus comprising:

(a) a memory for holding video signals which are coded and composed of frame units, (b) a horizontal differentiating filter for reading out luminance data from the memory and differencing in a horizontal direction of arbitrary image coordinates, (c) a vertical differentiating filter for reading out luminance data from the memory and differencing in a vertical direction of the image coordinates, (d) a time differentiating filter for reading out the luminance data of preceding and succeeding frames from the memory, and differencing in a time direction, (e) feature vector combining means for combining a luminance differential vector (Ix, Iy, It), including results from the horizontal differentiating filter, the vertical differentiating filter and the time differentiating filter, with a position vector (x, y) of the image coordinates, to obtain a sample vector, (f) a memory for holding a plurality of estimations of a motion vector (u, v) and a position vector mean ($\bar{x}$, $\bar{y}$) of the sample vector as class data, (g) nearest class determining means for determining a distance between the class data and the sample vector from a formula $(x-\bar{x}, y-\bar{y})$ and a formula $(u*Ix+v*Iy+It)$, and achieving a correspondence between the sample vector and the nearest class data, and (h) class data changing means for changing the class data in a manner that a distance sum between the class data and one or more sample vectors becomes smaller, from one or more sample vectors and the class data of which correspondence has been achieved by the nearest class determining means.

4. A motion vector detecting apparatus comprising:

(a) a memory for holding video signals which are coded and composed of frame units, (b) a horizontal differentiating filter for reading out luminance data from the memory and differencing in a horizontal direction of arbitrary image coordinates, (c) a vertical differentiating filter for reading out luminance data from the memory and differencing in a vertical direction of the image coordinates, (d) a time differentiating filter for reading out the luminance data of preceding and succeeding frames from the memory, and differencing in a time direction, (e) sample vector combining means for reading out color data including an array of one or more luminance values differing in color from the memory, combining (a) the color data, (b) a luminance differential vector $(Ix, Iy, It)$, including results from the horizontal differentiating filter, the vertical differentiating filter and the time differentiating filter, and (c) a position vector$(x, y)$ of the image coordinates, to obtain a sample vector, (f) a memory for holding a plurality of a position vector mean $(\bar{x}, \bar{y})$, an estimation of a motion vector $(u, v)$, and a mean of the color data of the sample vector, as class data, (g) nearest class determining means for determining a distance between the class data and the sample vector from a formula of $(x-\bar{x}, y-\bar{y})$, a formula of $(u*Ix+v*Iy+It)$ and a difference between the color data and the color data mean, and achieving a correspondence between the sample vector and the nearest class data, and (h) class data changing means for changing the class data in a manner that a distance sum between the class data and one or more sample vectors becomes smaller, from one or more sample vectors and the class data of which correspondence has been achieved by the nearest class determining means.

* * * * *